United States Patent [19]

Moan

[11] Patent Number: 4,827,805

[45] Date of Patent: May 9, 1989

[54] FORWARD AND REVERSE CLUTCH ACTUATION SYSTEM FOR A BELT-DRIVEN CONTINUALLY VARIABLE TRANSMISSION

[75] Inventor: Richard D. Moan, Livonia, Mich.

[73] Assignee: Ford Motor Company, Dearborn, Mich.

[21] Appl. No.: 1,594

[22] Filed: Jan. 8, 1987

[51] Int. Cl.⁴ .................................................. B60K 41/12
[52] U.S. Cl. ........................................ 74/867; 74/866; 192/3.58
[58] Field of Search .................. 74/867, 868, 869, 866, 74/689; 474/12, 18, 28; 192/3.3, 3.29, 0.052, 3.58

[56] References Cited

U.S. PATENT DOCUMENTS

| | | | |
|---|---|---|---|
| 4,428,258 | 1/1984 | Kubo et al. | 74/867 |
| 4,445,401 | 5/1984 | Ishimaru | 74/867 X |
| 4,462,275 | 7/1984 | Mohl et al. | 74/866 |
| 4,475,416 | 10/1984 | Underwood | 74/868 |
| 4,476,746 | 10/1984 | Niki et al. | 74/867 |
| 4,522,086 | 6/1985 | Haley | 74/867 |
| 4,618,036 | 10/1986 | Ideta | 192/3.3 |
| 4,618,038 | 10/1986 | Ogasawara et al. | 192/3.29 |
| 4,618,041 | 10/1986 | Sotoyama et al. | 192/0.052 |
| 4,618,042 | 10/1986 | Yamamoto | 192/0.044 |
| 4,619,157 | 10/1986 | Sakai | 74/689 |
| 4,619,350 | 10/1986 | Maezono et al. | 192/3.31 |
| 4,619,629 | 10/1986 | Shigematsu et al. | 474/28 |
| 4,619,630 | 10/1986 | Hattori | 474/28 |
| 4,622,865 | 11/1986 | Itoh et al. | 74/866 |
| 4,622,867 | 11/1986 | Nishioka et al. | 74/866 |
| 4,623,053 | 11/1986 | Nishikawa | 192/3.31 |
| 4,674,364 | 6/1987 | Shindo et al. | 74/867 |
| 4,677,878 | 7/1987 | Yamamori et al. | 74/868 X |
| 4,682,518 | 7/1987 | Takada et al. | 74/867 |
| 4,682,519 | 7/1987 | Okada et al. | 74/867 X |
| 4,700,591 | 10/1987 | Yasue et al. | 74/740 |
| 4,733,582 | 3/1988 | Eggert et al. | 74/867 |

Primary Examiner—Leslie A. Braun
Assistant Examiner—David Novais
Attorney, Agent, or Firm—Frank G. McKenzie; Donald J. Harrington

[57] ABSTRACT

In a continually variable belt-driven transmission, a system for actuating and controlling the operation of the forward clutch and reverse clutch includes a source of hydraulic pressure regulated at line pressure, an accumulator control valve, a line and belt load control solenoid and solenoid-actuated valve, an accumulator, a decel disconnect solenoid-operated valve and a manual valve. The line and belt-load control valve regulates a pressure signal applied to the accumulator control valve whose output pressure develops, on the piston of the accumulator, a force that adds to a spring force tending to purge the accumulator and add that flow to the flow through an orifice directed through the manual valve to the selected clutch. The decel disconnect solenoid operates in accordance with a control signal that senses the occurrence of a hard wheel brake condition to vent the forward clutch, thereby permitting the pulleys of the transmission to turn during the braking condition sufficient to allow a drive ratio change to the lowest drive ratio, and thereafter to regulate clutch pressure to permit immediate reacceleration of the vehicle.

6 Claims, 5 Drawing Sheets

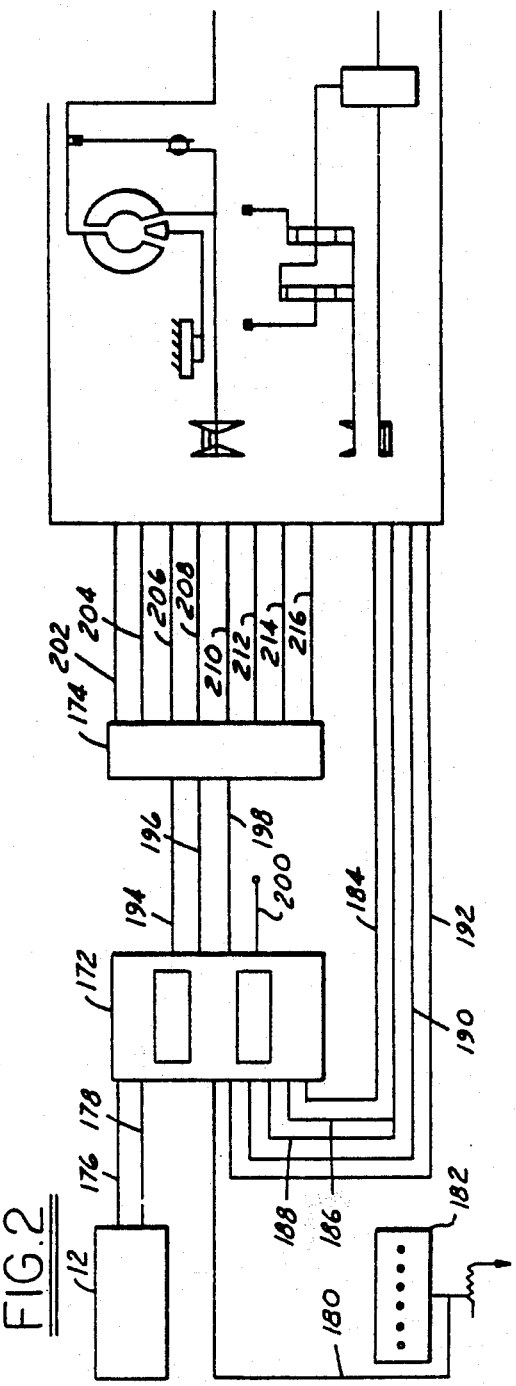

FORWARD AND REVERSE CLUTCH ACTUATION SYSTEM FOR A BELT-DRIVEN CONTINUALLY VARIABLE TRANSMISSION

BACKGROUND OF THE INVENTION

1. Field of the Invention

This invention relates to the field of hydraulic control circuits and hydraulic actuators for operating automatic transmissions of motor vehicles. More particularly, this invention pertains to clutch actuating systems for operating a continually variable belt-driven transmission in forward drive and reverse drive.

2. Background of the Invention

A continuously variable belt-driven transmission includes an endless belt driveably engaged with a primary pulley and a secondary pulley. Each pulley is supported rotatably on a shaft that includes an axially displaceable conical sheave, which is moved by a fluid-operated servo to change the radial position of the belt on the pulley in accordance with the commanded drive ratio. This system is provided with a line pressure regulator valve and a transmission ratio control valve.

A torque converter, used to extend the ratio range for acceleration after start up, is locked as vehicle speed increases and the torque converter reaches the coupling point. Forward drive and reverse drive are provided by a pair of gearsets driven by the secondary sheave on the same axis as the conventional differential.

The selection of forward drive and reverse drive is made via mechanical controlled hydraulically activated multiple disc clutches. In the operation of the forward and reverse clutches, it is important that there be no roughness associated with the engagement and that any delay in moving the transmission from forward drive to reverse drive be minimized. Generally, harsh engagements result because the speeds of the driving and driven elements of the clutch are not synchronized and because of the large inertia associated with one of the engaging parts.

To avoid harsh engagement of the clutches in the automatic transmission, orifices located in the line feeding the clutch have been used to restrict the flow rate of fluid to the cylinder of the clutch. If the flow rate is restricted, the engagement of the clutch is smooth because the speed and inertial differences can be accommodated through slipping of the clutch members, but a substantial delay in engaging the clutch producing the required drive necessarily results. To avoid the delay associated with the use of orifices, hydraulic actuating circuits of this type have been developed such that the orifice is included in the circuit that actuates the clutch only after pressure in the clutch piston has risen after the clearances among the clutch plates, piston and load block have been taken up. Generally, in the operation of systems of this type a valve senses this pressure rise and thereafter diverts flow through the orifice at a rate that is sufficiently low to avoid the impact of clutch engagement.

Generally, in systems of this type, engagement impact increases directly with the size of the orifice, but the delay between the command for clutch engagement and the actual engagement increases inversely with the size of the orifice.

Accumulators having a spring-loaded piston reciprocating within a cylinder that is filled as a function of the throttle angle of the engine have been used to cushion the impact of clutch engagement in an accelerating vehicle when the throttle angle increases, but to allow immediate engagement when the throttle angle is low.

SUMMARY OF THE INVENTION

When engine speed is low, the hydraulic pump that is the source of hydraulic pressure throughout the system has a flow rate that is insufficient to avoid undesirable delay in taking up the clearances in the selected clutch. It is preferable in such clutch actuation systems that some source of increased volume should add to the volumetric flow rate of the pump to supply pressurized hydraulic fluid to the selected clutch, particularly so in systems that employ an orifice to avoid harsh engagement because the orifice restricts the flow rate from the pump to the clutch. The system according to the present invention includes an accumulator having a spring-loaded piston moving within a cylinder that is filled from a source of line pressure at a first end of the accumulator, the spring force being amplified by a pressure force when line pressure is open to the second end of the accumulator in response to a command for clutch engagement produced by an electronic control. A line and belt load control VFS solenoid operates a line control valve that produces a pressure signal, which opens the source of line pressure to the second end of the accumulator.

When the command for clutch engagement is received, the clutch is filled by connecting the line pressure source through an orifice and adding to the orifice flow the flow from the accumulator which bypasses the orifice. When the clearances of the clutch components are taken up and the friction surfaces of the plates are in position to transmit torque, the variable force solenoid pressure regulates pressure in the clutch cylinder while allowing the accumulator to refill through a connection to the line pressure source. This permits a moderate rate of flow to the cylinder through the orifice, thereby avoiding harsh engagement and minimizing engagement delay.

In prior art solutions to this problem, the clutch actuation systems required two orifices and two accumulators, one each for each of the forward drive and reverse clutches. In the system according to this invention, only one accumulator and one orifice is required to feed both the forward clutch and the reverse clutch because all of the flow from the accumulator and the orifice is directed by the manual valve to the selected clutch. Each clutch is vented through the manual valve when it is moved to the neutral position located between the forward drive positions and the reverse drive position. In the system of this invention, the manual valve directs hydraulic fluid from the accumulator and from the line pressure source to the forward clutch when the PRNDL selector is moved to any of the forward drive positions, whereas in conventional actuation circuits, the manual valve defines discrete circuits by which the selected clutches are pressurized. This arrangement requires multiple accumulators and orifices associated with each of the clutch actuation circuits.

When a vehicle equipped with a continually variable transmission operating at relatively high speed has its wheel brake abruptly applied, the belt-pulley system attempts to downshift to the lowest drive ratio. However, when the drive belt and the pulleys on which they act are not lubricated, as in a rubber drive belt system, the downshift to the lowest drive ratio would generally be incomplete before the drive wheels and pulleys are completely stopped. Radial movement of the drive belt relative to the pulleys is impossible in a nonlubricated system after the pulleys have stopped. After the wheel braking is terminated and acceleration of the vehicle is attempted with the transmission in a higher drive ratio, delay and noisy operation can result.

To avoid this difficulty, the system of this invention includes a decel disconnect solenoid-operated valve whose winding is energized and deenergized in accordance with a pulse width modulated PWM signal produced by the computer control. The valve is located so that the flow from the accumulator and the line pressure source to the manual valve passes through the decel valve. When a hard braking condition is sensed by the computer control, the decel valve closes the flow to the forward clutch. Then, in accordance with the PWM signal, the pressure in the clutch cylinder is regulated to approximately 5 psi, a pressure sufficient to hold the friction surfaces of the clutch discs in contact but not to transmit any appreciable torque. The regulated pressure during the hard braking condition is maintained at a pressure such that the force on the clutch piston slightly exceeds the force of the return spring, thereby assuring that the clearances within the clutch are removed and the clutch is disposed for immediate torque transmittal. Disengagement of the forward clutch during a hard braking condition assures that the pulleys of the transmission can continue to turn sufficiently to bring the transmission to the lowest drive ratio condition and assures that the vehicle can be reaccelerated immediately and without delay after the braking condition is concluded.

BRIEF DESCRIPTION OF THE DRAWINGS

FIG. 2 is a schematic diagram of the electronic and hydraulic components of the control system for operating an automatic transmission.

DESCRIPTION OF THE PREFERRED EMBODIMENT

Figure 1A:
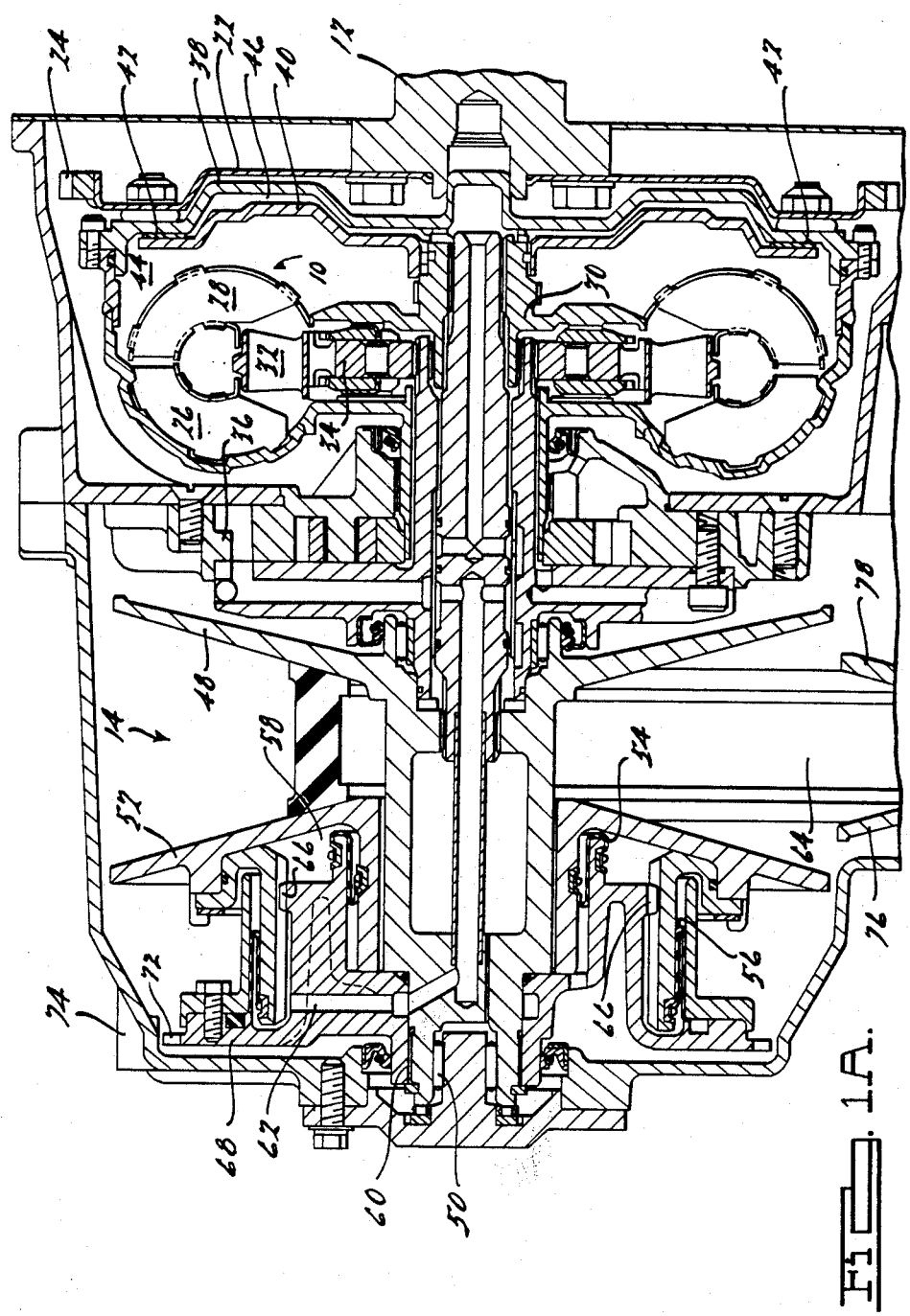
FIGS. 1A and 1B form a schematic diagram of a transmission whose operation is suitably controlled by this invention.
Figure 1B:
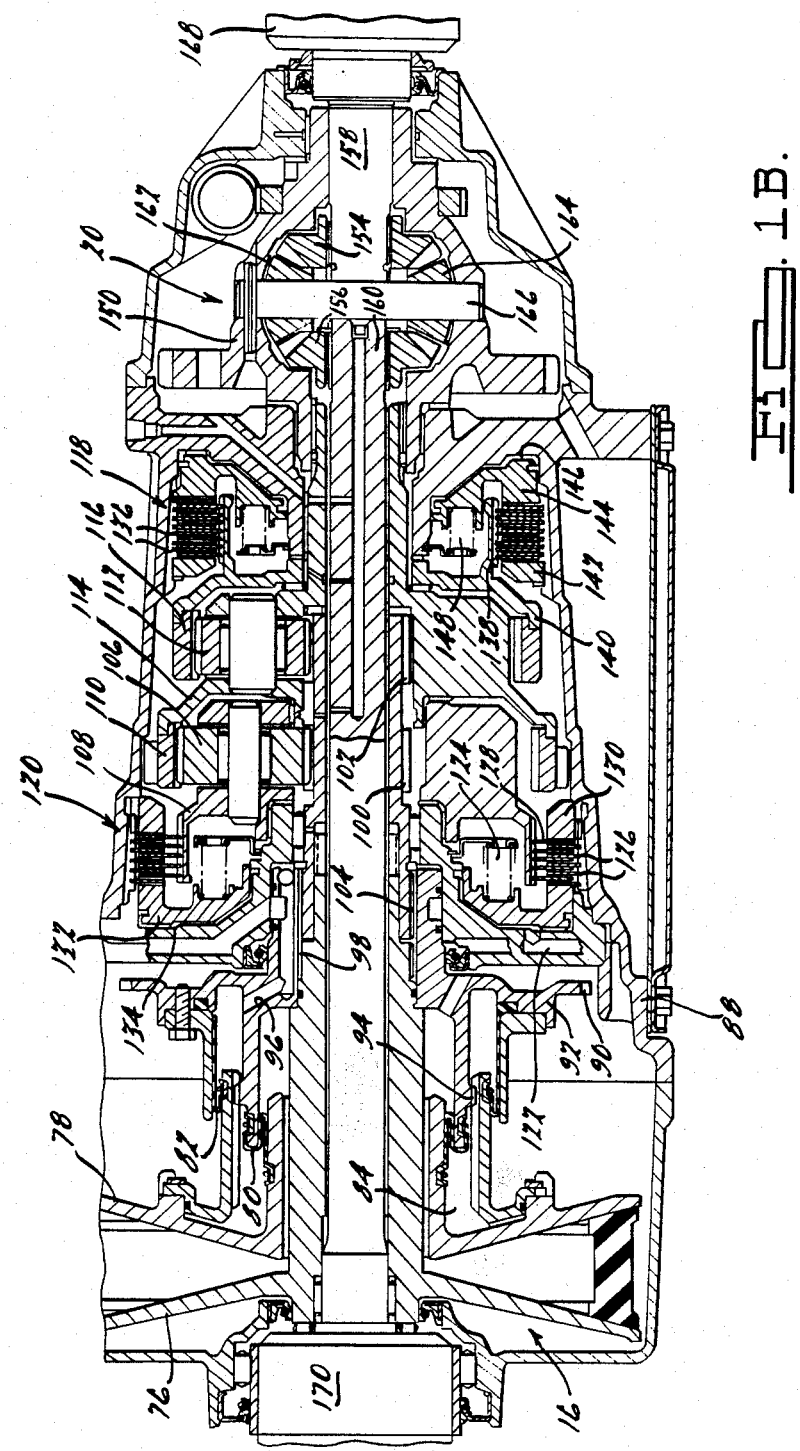

Referring first to FIG. 1, an automatic transmission, in particular a continually variable transmission for use in front-wheel drive vehicle whose engine and transmission are transversely mounted, includes a torque converter 10 driveably connected to an engine crankshaft 12, a primary or input variable diameter pulley 14, a secondary or output variable diameter pulley 16, final drive gearing and a differential mechanism 20.

The flywheel 22 fixed to the crankshaft has a starter gear 24 carried on its circumference. The torque converter includes an impeller 26, which is driven mechanically from the crankshaft, a turbine 28 driven hydrodynamically from the impeller and connected mechanically to a shaft 30, and a stator 32 connected by a one-way clutch 34 whose inner surfaces are splined to the rotor of a fixed displacement hydraulic pump 36. When the turbine is driven hydrodynamically from the impeller by the fluid contained in the torque converter, the transmission operates in the converter mode.

The disc 38, which connects the crankshaft to the blades of the impeller 26, and the adjacent disc 40, which is joined by a spline to shaft 30, carry mating friction surfaces and form collectively a lockup or slipping clutch 42 that selectively produces a mechanical connection between impeller 26 and turbine 28 when clutch 42 is engaged or permits a hydrodynamic drive connection between them when the clutch is disengaged. Lockup clutch pressure supplied to the converter casing in cylinder 44 causes tends to cause the clutch friction surfaces to driveably engage. Converter feed pressure supplied in passage 46 tends to separate the friction surfaces and allows clutch 42 to slip while some frictional contact is maintained on its friction surfaces, or to entirely disengage the clutch depending upon the magnitude of the hydraulic pressure supplied through line 46 and the opposing effect of the hydraulic pressure within cylinder 44.

The primary pulley 14 includes a fixed sheave 48, which is rotatably mounted on the support surfaces provided on the surface of pump 36 and at a bearing 50 on the transmission case. A displaceable sheave 52 is supported on the outer surface of sheave 48 for sliding movement toward and away from the fixed sheave. Inner and outer flexible diaphragm seals 54, 56, seal hydraulic cylinder 58, which is supplied with hydraulic fluid through passage 62. When cylinder 58 is pressurized, sheave 52 is moved axially toward fixed sheave 48, thereby causing drive belt 64 to move radially outward on sheaves 48, 52. Sheave 52 is connected by a spline 66 to a disc 68 on which is formed angularly spaced teeth 72, which pass in front of a variable reluctance primary pulley speed sensor 74 to produce a signal whose frequency is a measure of the rotational speed of the primary pulley 14.

Drive belt 64 is continually engaged also with the output or secondary pulley 16, which includes a fixed sheave 76 and a displaceable sheave 78. Inner and outer diaphragms seals 80, 82 seal hydraulic cylinder 84, which is selectively pressurized to move sheave 78 toward sheave 76 and vented to permit sheave 78 to move away from sheave 76.

The rotational speed of the output pulley is determined by a signal produced by a variable reluctance speed sensor 88 located so that the teeth 90 on the outer surface of disc 92 pass in front of the speed sensor.

Disc 92 supports on one end the diaphragm seals 80, 82, their other end being supported on displaceable sheave 78. Pressurized hydraulic fluid supplied through hydraulic passage 96 flows through spline 94 into cylinder 84 and pressurizes the outer surface of sheave 78, thereby moving drive belt 64 to a greater radial position on the secondary pulley 16 and to a lesser radial position on input pulley 14. Disc 92 is splined at 98 to the fixed sheave and provides driving continuity through spline 94 to sheave 78. Disc 68 is splined at 60 to fixed sheave 48 and at spline 66 to displaceable sheave 52, thereby driveably connecting sheaves 48 and 52.

Sun gears 100 and 102 are formed integrally on a gear wheel that is splined at 104 to the sheaves that form the secondary pulley 16. A first set of planetary pinions 106, rotatably supported on a carrier 108, is in continuous engagement with sun gear 100 and with ring gear 110. A second set of planetary pinions 112, rotatably supported on carrier 114, is in continuous meshing engagement with sun gear 102 and ring gear 116. Ring gear 110 is driveably connected to carrier 114 and ring gear 116 is selectively connected to the casing of the transmission through a forward drive clutch 118. Reverse drive clutch 120 selectively connects carrier 108 to the transmission casing.

Pressurized hydraulic fluid supplied through passage 122 engages reverse drive clutch 120, and spring 124 disengages that clutch. Clutch 120 includes a first set of clutch discs 126 splined to the transmission casing and a second set of discs 128 splined to carrier 108. Pressure block 130 reacts the pressure force developed on the face of the clutch piston 132 when the pressurized hydraulic fluid is admitted to clutch cylinder 134.

Forward drive clutch 118 includes a first set of clutch discs 136 splined to the transmission casing and a second set of clutch discs 138 splined to disc 140, which is fixed to ring gear 116. Pressure block 142 reacts the pressure forces developed on the face of clutch piston 144 when hydraulic fluid is admitted to clutch cylinder 146. Spring 148 driveably disconnects clutch discs 136, 138 when cylinder 146 is vented.

Forward drive results when reverse clutch 120 is vented and forward clutch 118 is pressurized. Then the output pulley 16 drives sun gear 102; ring gear 116 is held and carrier 114 drives the spindle wheel 150 of the differential mechanism 20 through a spline. Reverse drive results when clutch 120 is applied and clutch 118 is disengaged. Then secondary pulley 16 drives sun gear 100, carrier 108 is held, ring gear 110 drives carrier 114 and the differential spindle is driven in the reverse direction through the spline.

Side bevel gears 154, 156, driveably connected to output shafts 158, 160, respectively, are in continuous meshing engagement with bevel gears 162, 164, rotatably supported on the spindle 166. Half shafts 168, 170 drive the axle shafts that carry torque to the drive wheels of the vehicle from output shafts 158, 160, respectively.

FIG. 2 shows the various electric input signals supplied to a central processing unit and computer memory 172, the output signals produced by the computer and sent to the control elements of the valve body 174 and the hydraulic actuation signals produced by the valve body. Signal 176 representing the speed of the engine crankshaft and signal 178 representing the effective throttle angle position are taken from the engine and supplied as input to computer 172. A signal 180 representing the position of a PRNDL selector 182, controlled by the vehicle operator; a transmission oil temperature signal 184; a belt pressure signal 186; a lockup clutch pressure signal 188; the primary pulley 14 speed signal 190; and secondary pulley 16 speed signal 192 also are supplied as input to the computer.

Output signals sent from the computer and its associated conditioning circuits to variable force solenoids or to pulse width modulation solenoids located in or adjacent the valve body include: ratio control solenoid signal 194, lockup clutch control solenoid signal 196, line/belt load control solenoid signal 198 and decel disconnect signal 200. In addition, the computer produces signals convertible to digital displays observable by the vehicle operator.

The components of the valve body 174 produce from the three electrical control solenoid signals produced by the computer various hydraulic pressures that include line regulator pressure 202, ratio control pressure 204, belt load pressure 206, lockup clutch pressure 208, converter pressure regulation 210, forward/reverse clutch apply pressure 212, converter feed pressure 214 and line boost pressure 216.

Through manual operation of the PRNDL selector 182, the vehicle operator controls the position of a manual valve 220, which is a six-position, two-land valve that provides park, reverse, neutral, drive, drive 2, and hill brake HB operation. When the manual valve is in the park position, reverse clutch 120 and forward clutch 118 are vented at the manual valve. When the manual valve is in the reverse position, the forward clutch is vented at the manual valve and regulated line or pump discharge pressure is supplied through lines 222 and 224 to the manual valve. Input is directed to cylinder 134 of the reverse clutch through line 122. When the manual valve is in the neutral position, the reverse and forward clutches are exhausted at the manual valve. When the manual valve is in the drive, drive 2 or HB positions, the reverse clutch is vented and the forward clutch is pressurized from line 224 through line 226.

FORWARD CLUTCH AND REVERSE CLUTCH ACTUATION

The valve body includes an accumulator control valve 228 and an accumulator 230, which rapidly fills alternately the reverse and forward clutches 120, 118. Control valve 228 provides flow control to the accumulator as a function of a magnitude of the throttle angle, as determined by computer input signal 178 and in accordance with the control pressure output by line and belt load control valve 240. After starting the engine with the manual valve in the neutral position and before the PRNDL is moved to a forward drive position, the discharge side of the pump is connected by line 222 to the input of valve 228 and by line 232 through orifice 234 to a first end of accumulator 230, whose piston 236 is moved thereby to the left end of the accumulator cylinder as it is filled with fluid. Fluid remaining in the cylinder at the left side of the piston is vented from the second accumulator end through line 237, whose pressure forces the spool of valve 228 to the left end of the valve and closes input line 222. Springs 239, arranged coaxially and in parallel, bias piston 236 toward the first end of the accumulator. The forward and reverse clutch cylinders 146, 134 are exhausted through manual valve 220.

Figure 3A:
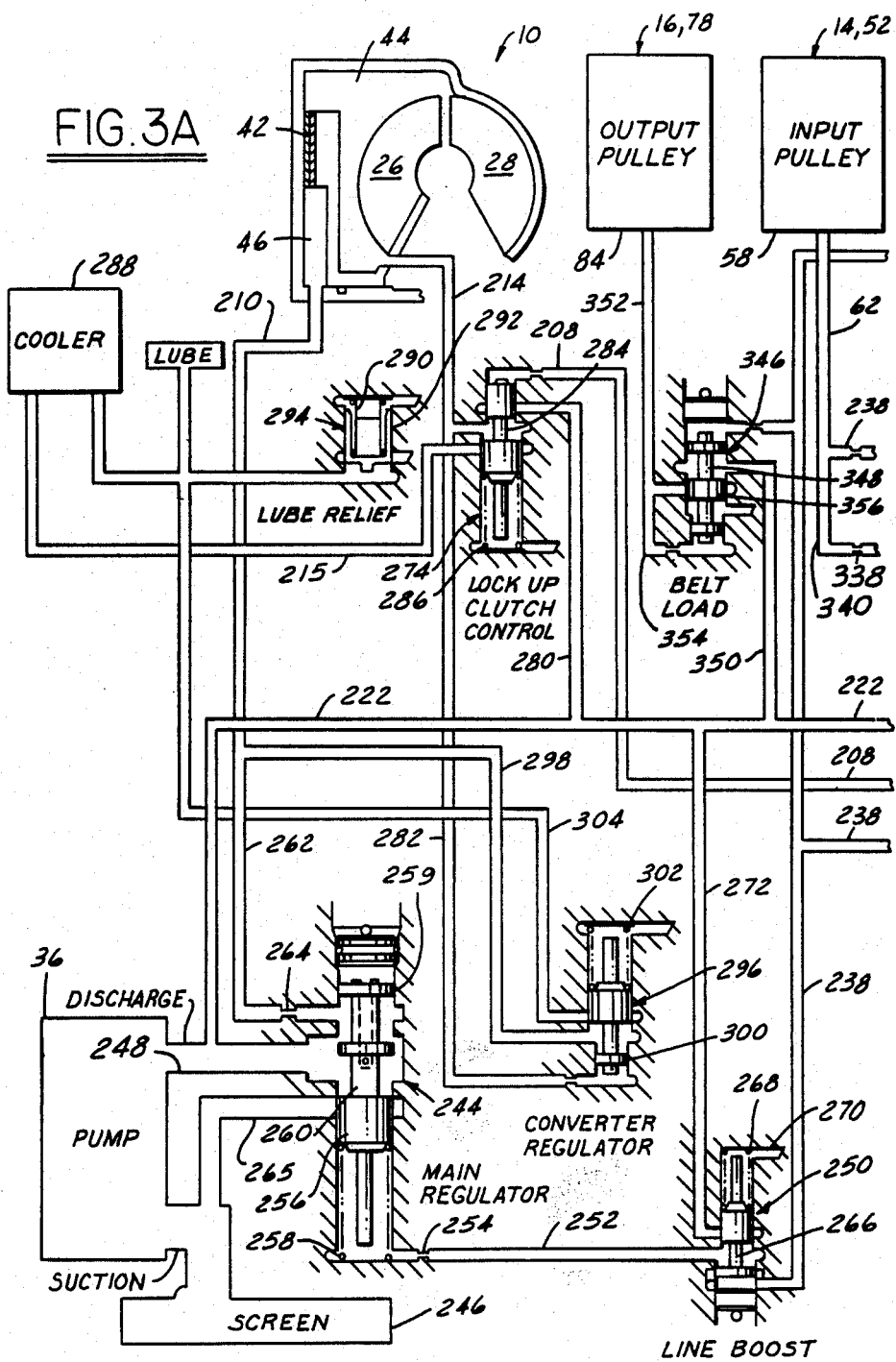
FIGS. 3A and 3B show the details of the hydraulic and electrical control.
Figure 3B:
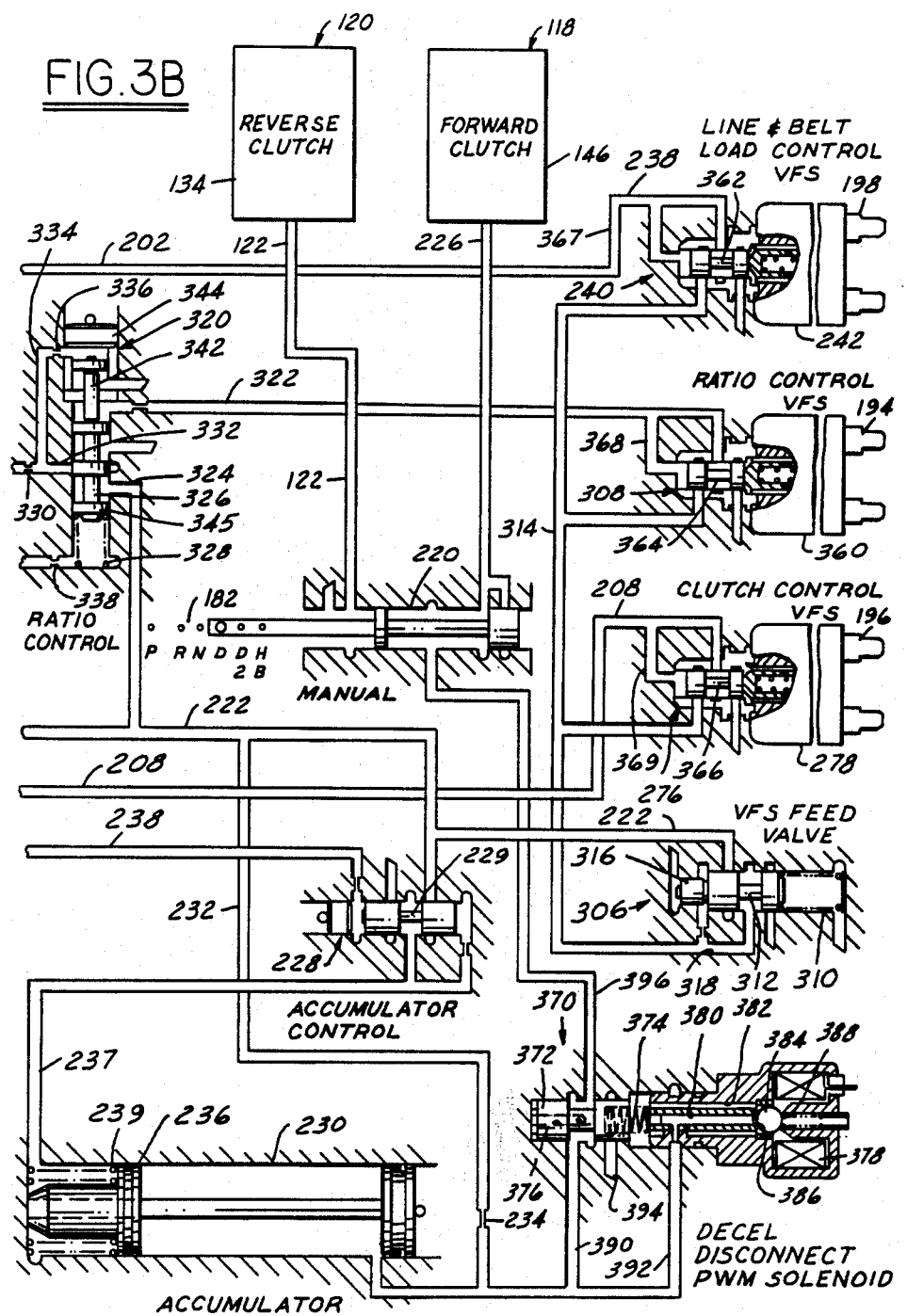

Then, when the forward drive position is selected, manual valve 220 opens forward clutch cylinder 146 to the discharge side of the pump through decel disconnect valve 370, which includes a spool 372 biased by a spring 374 to the position in FIG. 3; a feedback passage 376 in the spool; solenoid 378; concentric axial passages 380, 382; ball 384; seat 386 and plunger 388. Passages 390 and 392 connect the accumulator and the source of line pressure to valve 370. When solenoid 378 is deenergized, ball 384 moves off seat 386 and opens passage 382 and 392, thereby aiding spring 374 to move spool 372 to the position of FIG. 3. This fills cylinder 146 of forward clutch 118 from the discharge side of the pump and concurrently from the accumulator. The fluid is forced from the first end of the accumulator because accumulator control valve 228 receives control pressure through lines 202, 238 from belt/line control valve 240 when a command signal from the computer is applied to the windings of solenoid 242 in response to a shift of the PRNDL to a forward drive position from the neutral position and an increase in engine throttle position. The control pressure in line 238 forces spool 229 rightward, closes the connection between line 237 and the vent port of valve 228, and opens line pressure to the second end of the accumulator through line 237 and valve 228.

This action forces piston 236 rightward and adds the flow from the accumulator to the flow through 232 and orifice 234 to produce a higher flow rate to clutch 118 for rapid filling of clutch cylinder 146 until the clearance among the clutch piston, friction parts and pressure plate is taken up. Thereafter, clutch pressure is maintained with the lower flow rate through orifice 234, valve 370 and manual valve 220 in accordance with the force of forward clutch return spring 148. In this way, the computer signal to solenoid 242 regulates the forward clutch pressure by establishing the pressure output from control valve 240 during the return or filling stroke of piston 236 from the right side to the left side of cylinder 230. The control pressure in line 238 regulates the pressure in line 237 and, in combination with the force of springs 239, regulates the pressure in the clutch and in the accumulator as it fills again after the clutch is engaged.

If manual valve 220 is moved to the reverse position, clutch cylinder 146 is vented through valve 220 as the PRNDL selector moves to the neutral position; then the reverse clutch cylinder 134 is filled rapidly with flow through orifice 234 and from accumulator 230 through lines 390, 396 and 122. When reverse drive is selected, the computer produces a signal to the windings of solenoid 242, which moves spool 229 of control valve 228 to the right, thereby opening line 222 to the second end of the accumulator and forcing, with the force of springs 239, fluid from the right hand side of piston 236.

If while clutch 118 is engaged and the vehicle is at high speed, the operator abruptly applies the wheel brakes, the transmission will attempt to move to the lowest drive ratio by moving the radial position of the drive belt on the pulleys. However, it is unlikely that a shift to the lowest drive ratio will be completed because the drive belt cannot move radially on the pulleys after their rotation is stopped by the drive wheels being fully stopped. An attempt to accelerate the vehicle with the belt pulley system operating at a high drive ratio would be unacceptable. To permit the transmission to downshift to the lowest drive ratio following rapid hard braking of the drive wheels, the forward clutch pressure is controlled following this condition through operation of the decel disconnect solenoid, which receives a pulse width modulated PWM signal applied to its winding from the computer output when the hard braking condition is detected from the values supplied as input to the computer.

When the winding 378 of solenoid-operated valve 370 is energized, ball 384 closes the connection between passages 380 and 382, thereby removing the pressure force on land 374 and permitting the spool to move rightward, thereby closing the connection between lines 390 and 396 to cylinder 146 and venting cylinder 146 through port 394. Thereafter, a PWM signal on winding 378 opens the connection between passages 380 and 382 and reimposes a pressure force on land 374 in accordance with the duty cycle of the PWM signal to regulate a low pressure output to line 396 and the clutch cylinder. A pressure of 5 psi output by valve 370 produces a force on clutch piston 144 that exceeds slightly the force of clutch return spring 148 sufficient to hold the clutch plates 136, 138 in contact but without transmitting torque through the clutch.

Before or shortly after the operator disengages the foot brakes and depresses the accelerator pedal to accelerate the vehicle, the belt pulley will have shifted to the lowest drive ratio. Valve 370 is used to control the rate of pressure rise in clutch cylinder 146 to produce smooth engagement. Then the signal is removed from solenoid 378 and the forward clutch is pressurized with slight flow through orifice 234 from the line pressure source and through valves 370 and 220.

LINE PRESSURE AND CONVERTER FEED PRESSURE

The suction side of the fixed displacement pump 36 is supplied with hydraulic fluid from the pump through a screen 246, and the discharge side of the pump is carried in line 248 to the main regulator valve 244. The output from line boost valve 256 is carried in line 252 through orifice 254 and produces a pressure force on land 256, which combines with the force of spring 258 to oppose a net pressure force acting downward on land 259 of spool 260 to regulate the converter regulator pressure carried in line 262. If the pump discharge pressure is too high, spool 260 moves downward and connects line 248 to suction line 264, thereby reducing the pump pressure. If discharge pressure is too low, spool 26 moves upward due to the effect of line boost pressure and the force of spring 258, thereby sealing vent line 264 and allowing the discharge pressure to rise. Orifices 254 and 264 are provided to improve damping.

Line boost valve 250 includes a spool 266 biased downward by a spring 268, a vent port 270, input line 272 connected by line 222 to the discharge side of the pump and an output port connected by line 252 to the end of regulator valve 244. Line boost valve 250 is used to regulate line boost pressure as a function of the line and belt load control VFS pressure carried in lines 238 and 202. The output from the line boost valve is an input to the main regulator valve 244, which is used to increase line pressure in accordance with the magnitude of engine torque. When line control VFS pressure in line 238 is between zero and a first predetermined pressure, boost valve 250 is not regulating and line control VFS pressure is ported directly to the main regulator valve in line 252. When VFS pressure is equal to or greater than the first predetermined pressures, spool 266 moves upward against the force of spring 268 and line boost pressure in line 252 is regulated in accordance with line control VFS pressure which varies with engine torque.

Lockup clutch control valve 274 is an unbalanced regulator valve used to modulate converter clutch lockup pressure in lines 214 and 282 as a function of the clutch control VFS pressure carried in line 208. Clutch control VFS pressure is produced as output from the clutch control VFS valve 276 in accordance with a signal applied to the terminals 196 of clutch control variable force solenoid 278. The lockup clutch pressure causes the friction surfaces of lockup clutch 42 to engage and is modulated over a pressure range by modulating clutch control VFS pressure. The minimum clutch pressure is supplied in lines 282 and 214 to converter cylinder 44 when valve 274 is wide open, i.e. when clutch control VFS pressure carried in line 208 is a maximum. When this occurs, spool 284 moves downward against the force of spring 286 and the clutch control valve 274 exhausts to the lube circuit through the cooler 288. Lube pressure is set at a low value determined by the spring 290 and the area of piston 292 of the lube relief valve 294. This sets the minimum pressure in converter cylinder 44, which opposes the effect of pressure within passage 46 of lockup clutch 42.

Clutch control VFS pressure declines as the engine throttle opens, thereby permitting spool 284 to regulate the pressure to lines 214 and 282 and cylinder 44 from the pressure in line 280.

Converter regulator valve 296 is an unbalanced area valve used to regulate torque converter feed pressure as a function of lockup clutch pressure supplied from clutch control valve 274 through line 282. When the lockup clutch pressure force on clutch 42 is greater than the converter feed pressure force, lockup clutch 42 is engaged and the torque converter is disabled. However, when converter feed pressure force on clutch 42 is greater than lockup clutch pressure force, the torque converter is operative. When lockup clutch pressure is below 10 psi, converter feed pressure is equal to line pressure less the pressure drop across orifice 264, but as lockup clutch pressure increases, the force it produces on land 300 acting in opposition to the force of spring 302 opens converter feed line 298 to lube relief valve 294 and regulates the converter feed pressure inversely as lockup clutch pressure increases.

CONVERTER LOCKUP CLUTCH SYSTEM OPERATION

When the transmission is operating in converter mode, converter feed pressure is supplied from regulator valve 244 through orifice 264, line 262, 210, passage 46 and lockup clutch 42 to torque converter 10. This pressure disengages the friction surfaces of clutch 42 because the pressure force tending to engage clutch 42 is relatively low. Clutch control VFS pressure supplied in line 208 to clutch control valve is high; therefore spool 284 closes line 208 and opens converter line 214 from the converter to cooler feed line 215. Relief valve 294 sets the maximum pressure in line 215 cooler and the lube circuit at 10 psi. Because converter feed pressure is high relative to lockup clutch pressure, converter regulator valve 296 regulates converter fuel line 298 by dumping fluid to the lube relief valve when converter fuel pressure exceeds 50-60 psi.

When the transmission operates with the torque converter open, clutch control VFS pressure falls through operation of clutch control VFS valve 276 in accordance with the signal applied to terminal 196 of solenoid 278. This causes clutch control valve 274 to close the connection between converter line 214 and cooler feed line 215, and to regulate a rising lockup clutch pressure in lines 214 and 282 on the basis of clutch control VFS pressure and the force of spring 286. This regulated pressure is imposed on converter regulator valve 296, which drops converter fuel pressure by opening line 298 to relief valve 294 through line 304.

This action causes converter feed pressure in line 210 and passage 46 to fall and lockup clutch pressure in line 214 and cylinder 44 to rise. Thus the converter gradually is supplied with fluid from the clutch control valve rather than from the main regulator valve. When the force on clutch 42 due to lockup pressure in cylinder 44 exceeds the force due to converter feed pressure, clutch 42 engages, the converter is locked up and its impeller and turbine are connected mechanically, rather than hydrodynamically.

VFS FEED VALVE

The variable force solenoid VFS feed valve 306 is an unbalanced area pressure regulator valve used to regulate pump discharge pressure to a magnitude suitable for use by the VFS valves 240, 276 and 308. The force of spring 310 moves spool 312 to the fully opened position, thereby connecting line pressure in line 222 to the VFS feed line 314; provided line pressure is below a predetermined value. When that value is exceeded, the pressure force developed on land 316 by fluid fed back through line 318 moves spool 312 against the force of spring 310 and closes the connection between line pressure 222 and supply line 314, thereby limiting the VFS feed pressure to about 90 psi.

RATIO CONTROL SYSTEM

Ratio control valve 320 is a pressure compensated flow control valve used to control hydraulic flow into and out of cylinder 58 of the primary belt pulley 14 to change the drive ratio of the belt-pulley system. When ratio control VFS pressure produced by solenoid-operated valve 308 and supplied to ratio control valve 320 through line 322 is below a predetermined pressure, regulated line pressure from the discharge side of the pump is directed to the primary pulley cylinder 58 through the ratio control valve and orifice 330 to produce an overdrive ratio. When ratio control VFS pressure is greater than this predetermined magnitude, regulated line pressure is directed away from cylinder 58 and cylinder 84 of the output pulley 16 is pressurized to produce a shift to a lower drive ratio. The output pressure range of the ratio control VFS solenoid valve 308 is zero to 90 psi. When commanding a shift to a higher drive ratio than the current drive ratio, the VFS signal pressure range available is approximately 25 psi. When commanding a shift to a lower drive ratio, the VFS signal pressure range available is 65 psi. Therefore, greater signal response is available when making a wide open throttle angle ratio change to underdrive operation.

Ratio control valve 320 includes line pressure port 324 communicating with the discharge side of the pump, a first spool 326 biased upward within the valve chamber by spring 328, an orifice 330 in the output line 332 through which primary pulley cylinder 58 is supplied, feedback line 334, an orifice 336, orifice 338 in feedback line 340, and a valve element 342 held by hydraulic pressure force on land 344 in contact with spool 326.

Pressure compensated flow control is incorporated in ratio control valve 320 so that flow into and out of primary pulley cylinder 58 is directly regulated by the VFS ratio control solenoid electrical signal and pressure in line 322 independently of pressure changes upstream and downstream from the valve. The valve is inherently self compensating to either pump discharge pressure or primary pulley cylinder pressure variations. For example, if VFS ratio control pressure is decreased to 20 psi, spool 326 moves upward, thereby connecting regulated line pressure in line 324 to line 322 and cylinder 58 through metering orifice 330. Spool 326 will stop moving upward when the force balance is reestablished. In the steady-state condition, the pressure drop across orifice 330 is proportional to the VFS control pressure. The primary pulley will move toward its overdrive position at a speed related to the fixed flow rate across orifice 330.

If displaceable sheave 52 of the input pulley assembly 14 encounters increased axial friction as it moves to a lower drive ratio position, the pressure in primary pulley cylinder 58 will increase, thereby tending momentarily to decrease the pressure drop across orifice 330 and to increase the pressure on both sides of orifice 330. The pressure in feedback lines 334 and 340 now apply a reduced differential pressure on lands 344 and 345, respectively, which causes spool 342 to move upward. This movement further opens the connection between lines 324 and 62 and increases the flow to cylinder 58 back to the original flow because ratio control VFS pressure is maintained constant during this self-compensation. The pressure drop across orifice 330 returns to its original value. Valve 320 then is renulled at the original flow rate across orifice 330, thereby reestablishing the initial flow rate into cylinder 58. The same self-flow compensation occurs with respect to disturbances in regulated line pressure in line 324.

BELT LOAD

Belt load valve 346 is an unbalanced pressure regulator valve used to control belt clamping load by controlling the pressure on the displaceable sheave 78, which moves in accordance with pressure supplied to cylinder 84 of output pulley 16. The belt clamping load requirement on the secondary pulley is a function of engine torque and the drive ratio to be produced by the belt-pulley system. Execution of a control algorithm in computer 172 determines the clamping loads, which are then converted to a belt load control VFS pressure carried in lines 202 and 238 to belt load valve 346. Pressure in line 238 produces a force on spool 348 tending to open the connection between line pressure in line 350 and cylinder 84, which is supplied through line 352. Pressure carried in feedback line 354 produces a lesser force on spool 348 that opposes the force resulting from the pressure produced by line and belt load control VFS valve 240. Therefore, belt load pressure supplied to cylinder 84 is greater than VFS pressure.

The secondary pulley servo, which includes cylinder 84 and sheave 78, holds maximum engine torque while the torque converter 10 is operating in stall condition and at maximum belt underdrive ratio. The secondary sheave clamping loads induce axial loads in the primary sheave due to belt tension.

The variable force solenoids 242, 278 and 360 produce an outward flow from valves 240, 276 and 308, respectively, that is proportional to the input current supplied to the windings of the respective solenoids through terminals 198, 194 and 196. VFS feed valve 306 supplies hydraulic fluid through line 314 to each of the valves operated by the variable force solenoids. Each of the valves includes a spool 362, 364, 366 that opens and closes communication between line 314 and the outlet line 238, 322 and 208 of the respective valve. Each output line has a feedback line 367-369 that maintains the valve spool in contact with the plunger whose position is controlled by the current supplied to the winding of the respective solenoid. The position of the spool determines the flow rate of hydraulic fluid from the valve in proportion to the magnitude of current supplied to the solenoid windings.

Having described a preferred embodiment of my invention, what I claim and desire to secure by U.S. Letters Patent is:

I claim:

1. A system for actuating forward drive and reverse drive clutches in a continually variable transmission comprising:
    a source of line pressure;
    manual valve means selectively moveable manually by a vehicle operator among reverse drive, neutral and forward drive positions for directing fluid to the clutches in accordance with the selected drive position;
    valve means for producing line control pressure in accordance with a command for clutch engagement; and
    an accumulator defining a cylinder having a piston moveable therein, a first end connected to the source line pressure and to the manual valve, and a second end located on the opposite side of the piston from the location of the first end connected to and disconnected from the line control pressure, whereby the selected clutch is supplied with fluid from the accumulator and the line pressure source.

2. The system of claim 1 wherein the valve means includes an accumulator control valve for connecting the source of line pressure to the second end of the accumulator in response to line control pressure and for venting the second end of the accumulator.

3. The system of claim 1 wherein the valve means further includes a line control valve operated by a solenoid for producing the line control pressure in response to the energized and deenergized state of the solenoid.

4. The system of claim 2 further including an orifice located between the source of line pressure and the first end of the accumulator, and the accumulator control valve includes:
    a port connected to the source of line pressure;
    a port connected to an outlet of the line control valve;
    a vent port;
    a port connected to the second end of the accumulator;
    a feedback port;
    a spool having lands for selectively opening and closing communication between the second end of the accumulator, the vent port and the port connected to the source of line pressure, moveable by pressure force produced by the line control pressure and the pressure in the feedback port.

5. The system of claim 1 further comprising:
    decel disconnect valve means for opening communication from the first end of the accumulator and the source of line pressure to the manual valve, for closing said communication, and for regulating the pressure supplied to the manual valve from the line pressure source in accordance with a command for decel disconnect control.

6. The system of claim 5 wherein the decel disconnect valve means includes:
    first and second ports connected to the source of line pressure and the first end of the accumulator;
    a port connected to the manual valve;
    a vent port;
    a spring;
    a valve spool biased by the spring to open the first port to the port connected to the manual valve;
    first feedback means biasing the spool to close the first port to the port connected to the manual valve in opposition to the force of the spring and second feedback means for opening the first port to the port connected to the manual valve;
    a solenoid-operated valve for opening and closing the second feedback means; and
    means for closing the second feedback means and for regulating the pressure at the port connected to the manual valve in accordance with engine torque output.

* * * * *